(12) United States Patent
Kimura et al.

(10) Patent No.: US 11,512,777 B2
(45) Date of Patent: Nov. 29, 2022

(54) PISTON RING

(71) Applicant: KABUSHIKI KAISHA RIKEN, Tokyo (JP)

(72) Inventors: Takashi Kimura, Kashiwazaki (JP); Yuji Shima, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 17/050,206

(22) PCT Filed: Apr. 24, 2019

(86) PCT No.: PCT/JP2019/017384
§ 371 (c)(1),
(2) Date: Oct. 23, 2020

(87) PCT Pub. No.: WO2019/208621
PCT Pub. Date: Oct. 31, 2019

(65) Prior Publication Data
US 2021/0071761 A1 Mar. 11, 2021

(30) Foreign Application Priority Data

Apr. 26, 2018 (JP) .............................. JP2018-084815

(51) Int. Cl.
*F16J 9/26* (2006.01)
(52) U.S. Cl.
CPC ....................... *F16J 9/26* (2013.01)
(58) Field of Classification Search
CPC ....................... F16J 9/26; F16J 9/00
See application file for complete search history.

(56) References Cited

U.S. PATENT DOCUMENTS

| | | | |
|---|---|---|---|
| 2014/0117626 A1 | 5/2014 | Shima | |
| 2017/0101598 A1 | 4/2017 | Cant et al. | |
| 2017/0327957 A1* | 11/2017 | Ablas Marques | ......... F16J 9/26 |
| 2018/0180181 A1 | 6/2018 | Ozaki et al. | |

FOREIGN PATENT DOCUMENTS

| | | | | |
|---|---|---|---|---|
| CN | 105579749 A | * | 5/2016 | ............. C22C 38/24 |
| JP | 5-186854 A | | 7/1993 | |
| JP | 6-145911 A | | 5/1994 | |
| JP | 3681696 B2 | * | 8/2005 | |
| JP | 2006169624 A | * | 6/2006 | |

(Continued)

OTHER PUBLICATIONS

International Search Report issued in PCT/JP2019/017384 (PCT/ISA/210), dated Aug. 6, 2019.

(Continued)

*Primary Examiner* — Gilbert Y Lee
(74) *Attorney, Agent, or Firm* — Birch, Stewart, Kolasch & Birch, LLP

(57) ABSTRACT

To provide a piston ring excellent in thermal setting resistance, and also excellent in side surface wear resistance even under such a high-temperature high-pressure environment as to be more than 300° C. and up to 400° C., the base metal of the piston ring is a steel containing, by mass %, C: 0.30 to 0.65%, Si: 0.80 to 1.20%, Mn: 0.20 to 0.60%, Cr: 4.50 to 5.70%, Cu: 0.01 to 0.5%, and at least one of Mo, V, W, and Co: 0.2 to 5.4%.

11 Claims, 3 Drawing Sheets

(56) References Cited

FOREIGN PATENT DOCUMENTS

| JP | 2013-7404 A | 1/2013 | | |
|---|---|---|---|---|
| JP | 2017-71776 A | 4/2017 | | |
| JP | 6511126 B1 * | 5/2019 | ............. | C23C 28/04 |
| WO | WO 2017/022660 A1 | 2/2017 | | |
| WO | WO 2018/056282 A1 | 3/2018 | | |

OTHER PUBLICATIONS

Written Opinion of the International Searching Authority issued in PCT/JP2019/017384 (PCT/ISA/237), dated Aug. 6, 2019.
Extended European Search Report for European Application No. 19793208.0, dated Apr. 14, 2022.

* cited by examiner

1 µm

1 µm

1 μm

PISTON RING

TECHNICAL FIELD

The present invention relates to a piston ring for an automotive engine. More particularly, it relates to a piston ring excellent in thermal setting resistance and wear resistance.

BACKGROUND ART

In recent years, the reduction of the environmental burden and the environmental conservation on a global scale have been advocated. In order to suppress the emission of $CO_2$ considered as one factor of global warming, higher performances and improvement of the fuel consumption performances (lower fuel consumption) of an automotive engine have been strongly demanded. Specifically, direct injection and higher compression of a fuel advance, so that boosted downsized engine tends to increase.

With a boosted direct injection downsized engine, in order to combine the fuel economy and the power performance, the driving conditions in a low-rotation high-load state increase. An abnormal combustion phenomenon referred to as low speed pre-ignition is often observed before the compression top dead center. As the mechanism for causing low speed pre-ignition, the following hypothesis is proposed: sprayed fuel is deposited on a liner, and is mixed with a lubricating oil, and the resulting mixture is scattered as droplets, thereby acting as a source of ignition. When the low speed pre-ignition is caused, the unburnt gas on the intake valve side is compressed and ignited, and pressure vibration is caused. Further, a piston type component is placed under a high-temperature high-pressure environment of more than 300° C., undesirably resulting in accumulation of damages.

In particular, for a piston, the ring groove is softened, so that the ring groove wear becomes more likely to be caused due to the repeated collision between the piton ring side surface and the ring groove side surface. The ring groove wear hinders the rotation of the piston ring, and promotes the inflow of a high-temperature high-pressure gas into the abutment joint of the piston ring and the groove worn part, resulting in a further increase in thermal load on the piston ring. With a piston ring without heat resistance, thermal setting (the loss of tangential force is specified at 8% or less under the test conditions of 300° C. and 3 hours according to the ISO standard) is caused, resulting in the reduction of the ring function.

Patent Literature 1 pays attention to a lubricating oil from the viewpoint of suppressing the occurrence of low speed pre-ignition in a boosted direct injection downsized engine, and proposes a method in which a crank case is lubricated with a lubricating oil composition containing a detergent additive containing an oil soluble basic organic acid salt containing at least magnesium and calcium as cations.

Patent Literature 2 discloses a piston ring (pressure ring) material having such a microscopic texture as to have a high thermal conductivity, and exhibit excellent thermal setting resistance even at a temperature as high as 300° C., enabling the heat of a piston head to be released to the cylinder wall that is cooled with efficiency. This, however, in actuality, fell short of sufficiently exhibiting the ring function under such a high-temperature high-pressure environment as to be more than 300° C. and up to 400° C.

CITATION LIST

Patent Literature

Patent Literature 1: Japanese Patent Application Laid-Open No. 2017-71776
Patent Literature 2: Japanese Patent Application Laid-Open No. 2013-7404

SUMMARY OF INVENTION

Technical Problem

In view of the circumstances, it is an object of the present invention to provide a piston ring excellent in thermal setting resistance, and also excellent in side surface wear resistance even under such a high-temperature high-pressure environment as to be more than 300° C. and up to 400° C.

Solution to Problem

Up to this point, as a piston ring material excellent in wear resistance, and excellent in thermal setting resistance, there has been used the one obtained by subjecting a 17% Cr type martensite stainless steel (JIS SUS440B equivalent material) to a nitriding treatment. Although the material exhibited excellent thermal setting resistance at up to 300° C., the loss of tangential force exceeded 10% at 400° C. Thus, the present inventor conducted a close study on such a material composition as to provide a texture including more fine carbide dispersed therein in order to solve the problem. As a result, by allowing the abovementioned 17% Cr type martensite stainless steel to have a reduced Cr content, and to include Mo and V each in an increased amount, and to further include Cu, and to selectively include W, Co, or the like, a piston ring excellent in thermal setting resistance, and also excellent in side surface wear resistance due to a nitriding treatment was successfully obtained, leading to the completion of the present invention.

Namely, a piston ring of the present invention is a piston ring excellent in thermal setting resistance and wear resistance, and is characterized by including a steel containing, by mass %, C: 0.30 to 0.65%, Si: 0.80 to 1.20%, Mn: 0.20 to 0.60%, Cr: 4.50 to 5.70%, Cu: 0.01 to 0.5%, and at least one of Mo, V, W, and Co: 0.2 to 5.4%. The steel preferably includes, by mass %, C: 0.30 to 0.65%, Si: 0.80 to 1.20%, Mn: 0.20 to 0.60%, Cr: 4.50 to 5.70%, Cu: 0.01 to 0.5%, Mo: 1.0 to 1.6%, V: 0.5 to 1.2%, the balance: Fe, and inevitable impurities. Further, the Mo: 1.0 to 1.6 mass % can be replaced with (W+2Mo): 2.0 to 3.2 mass %, and further the steel can include Co: 2 mass % or less.

The steel can include P in an amount of 0.002 to 0.02 mass % as the inevitable impurities.

The steel preferably includes vanadium carbide particles with an average particle size of 0.05 to 0.30 μm dispersed therein.

The piston ring preferably includes a nitride layer formed at least one of upper and lower side surfaces thereof perpendicular to an axial direction thereof. Further, in the nitride layer, at least one of nitride particles and carbonitride particles with an average particle size of 0.05 to 0.30 μM are preferably dispersed.

Further, a loss of tangential force of the piston ring is preferably 4% or less under the test conditions of 3 hours in 300° C. air, and is preferably 10% or less under the test conditions of 3 hours in 400° C. air.

Further, at least an outer peripheral face of the piston ring preferably includes at least one hard film layer selected from a nitride layer, hard chromium plating, hard ceramic, and hard carbon.

Advantageous Effects of Invention

The piston ring of the present invention is excellent in thermal setting resistance even under such a high-temperature high-pressure environment as to be more than 300° C. up to 400° C. Further, when a nitride layer is formed at the side surface of the piston ring, the ring groove wear of the piston can be reduced. Thus, the piston ring is also applicable to a boosted direct injection downsized engine.

DESCRIPTION OF EMBODIMENTS

Figure 1:
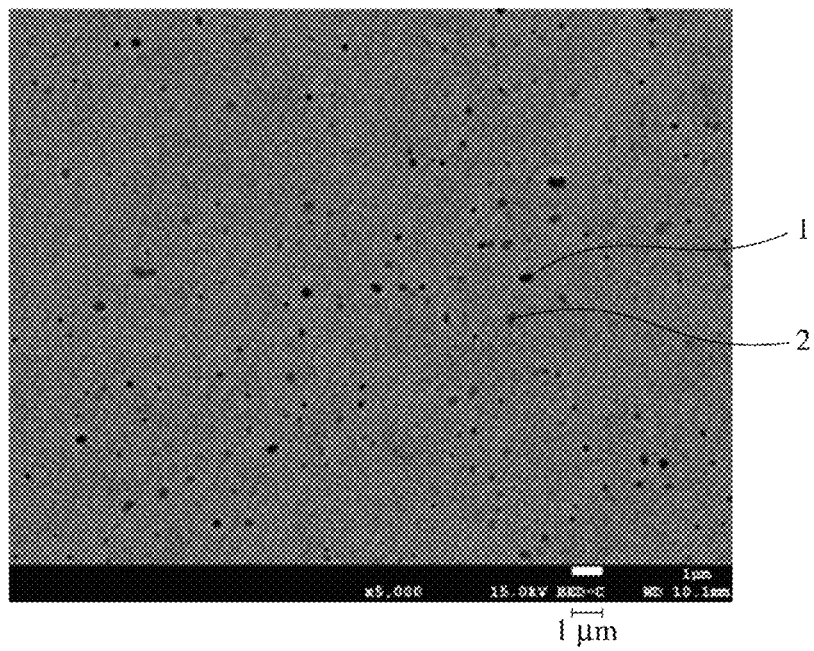
FIG. 1 is a view showing a backscattered electron image by FE-SEM of a base metal (steel material) of a piston ring of Example 1.

In order to provide a piston ring excellent in thermal setting resistance even under such a high-temperature high-pressure environment as to be more than 300° C. up to 400° C., a piston ring of the present invention uses a steel including, by mass %, C (carbon): 0.30 to 0.65%, Si (silicon): 0.80 to 1.20%, Mn (manganese): 0.20 to 0.60%, Cr (chromium): 4.50 to 5.70%, Cu (copper): 0.01 to 0.5%, and at least one of Mo (molybdenum), V (vanadium), W (tungsten), and Co (cobalt): 0.2 to 5.4% as the base metal. Selection of this composition, namely, a relatively small amount (0.30 to 0.65 mass %) of C, and Cr, Mo, V, and W form carbides, which are finely dispersed, particularly, vanadium carbide (VC) is finely dispersed. This enhances softening resistance at high temperatures, and improves thermal setting resistance. In particular, the combination of Mo: 1.0 to 1.6 mass % and V: 0.5 to 1.2 mass % is preferable.

C is an element for being partially dissolved in the form of solid solution in the base to impart strength other than for forming the foregoing carbide. Accordingly, as the C content, at least 0.30 mass % is required. However, the upper limit of the C content is set at 0.65 mass % so as to prevent the formation of the hypereutectoid structure. The C content is preferably 0.30 to 0.52 mass %, and more preferably 0.32 to 0.45 mass %.

Si and Mn each function as a deoxidizer. Further, Si imparts thermal setting resistance at high temperatures. For this reason, in the present invention, the Si content is set at 0.80 to 1.20 mass %, and the Mn content is set at 0.20 to 0.60 mass %. Si is contained in an amount of preferably 0.85 to 1.15 mass %, and more preferably 0.9 to 1.10 mass %. Mn is contained in an amount of preferably 0.25 to 0.60 mass %, and more preferably 0.25 to 0.55 mass %.

Cr not only forms a carbide to enhance wear resistance, but also is partially dissolved in the form of solid solution in the base to improve even heat resistance, thermal setting resistance, oxidation resistance, and corrosion resistance. In the present invention, the content is set at 4.50 to 5.70 mass %. The content is preferably 4.60 to 5.50 mass %, and more preferably 4.70 to 5.40 mass %.

Cu is known as an element for improving corrosion resistance. Further, Cu is hardly dissolved in the form of solid solution in Fe, and hence is finely precipitated in the base, particularly in the grain boundary, to function as a lubricant. However, excessive precipitation hinders hot workability. In the present invention, the content is set at 0.01 to 0.5 mass %. The content is preferably 0.01 to 0.36 mass %, and more preferably 0.02 to 0.18 mass %. When importance is attached to the workability, the content is preferably 0.01 to 0.10 mass %, more preferably 0.01 to 0.07 mass %, and further preferably 0.01 to 0.04 mass %.

Mo, V, and W are each a strong carbide forming element as described previously. In particular, Mo and W improve high temperature strength, and V contributes to miniaturization of carbide. However, inclusion of a large amount of Mo and W deteriorates oxidation resistance. Further, Co is an element for imparting toughness, corrosion resistance, and heat resistance. These are selectively added, and the total content thereof is set at 0.2 to 5.4 mass % or less. The total content thereof is preferably 0.5 to 4.8 mass %, and more preferably 1.0 to 4.2 mass %. Mo is contained in an amount of preferably 1.0 to 1.6 mass %, and more preferably 1.1 to 1.5 mass %. Mo exerts substantially the same effect as that of W at a ratio of W=2Mo by mass ratio. For this reason, it is also possible to replace a part of or the whole amount of Mo with W. When W is included alone, W is contained in an amount of preferably 2.0 to 3.2 mass %, and more preferably 2.2 to 3.0 mass %. When Mo and W are added in combination, Mo and W are preferably contained in an amount of 2.0 to 3.2 mass % as (W+2Mo). On the other hand, V is contained in an amount of preferably 0.5 to 1.2 mass %, more preferably 0.6 to 1.1 mass %, and further preferably 0.7 to 1.0 mass %. Further, Co is contained in an amount of preferably 2 mass % or less, more preferably 0.1 to 1.8 mass %, and further preferably 0.5 to 1.5 mass %.

The steel materials for use in the piston ring of the present invention include inevitable impurities other than the essential elements including Fe (iron) or selectively added elements as described above. The inevitable impurities generally include P (phosphorus) and S (sulfur), and may also optionally include Ni (nickel). These are each preferably contained in an amount of less than 0.002 mass %. However, reduction of the amount of the impurities of the steel material requires a large cost. For this reason, in particular, in the case of P, the amount is preferably 0.002 to 0.02 mass %, more preferably 0.002 to 0.01 mass %, and further preferably 0.002 to 0.008 mass %, in consideration of the realistic cost.

FIG. 1 shows a backscattered electron image by FE-SEM (Field Emission-Scanning Electron Microscopy) of a piston ring base metal of Example 1 described later. In the gray matrix, black fine particles 1 and dark gray fine particles 2 are dispersed. The EDX (Energy Dispersive X-ray spectrometry) analysis indicates as follows: the black fine particle 1 is V carbide, and the dark gray fine particle 2 is Cr carbide; and either has a submicron size. The present invention is particularly characterized by the presence of the stable V carbide 1. The V carbide 1 has an average particle size of preferably 0.05 to 0.30 more preferably 0.05 to 0.25 μm, and further preferably 0.05 to 0.20 μm. As a matter of course, the Cr carbide 2 also has an average particle size of preferably 0.05 to 0.30 more preferably 0.05 to 0.25 μm, and further preferably 0.05 to 0.20 μm. Herein, the average particle sizes of the V carbide 1 and the Cr carbide 2 were determined in the following manner: the V carbide 1 and the Cr carbide 2 were discriminated according to the density of each carbide from the backscattered electron images; thus, the area S per carbide was determined from the total area of respective carbides by the image analysis of a prescribed visual field (25 μm×20 μm); as a result, each average particle diameter was determined as the equivalent circle diameter ($\sqrt{(4S/\pi)}$).

Figure 2:
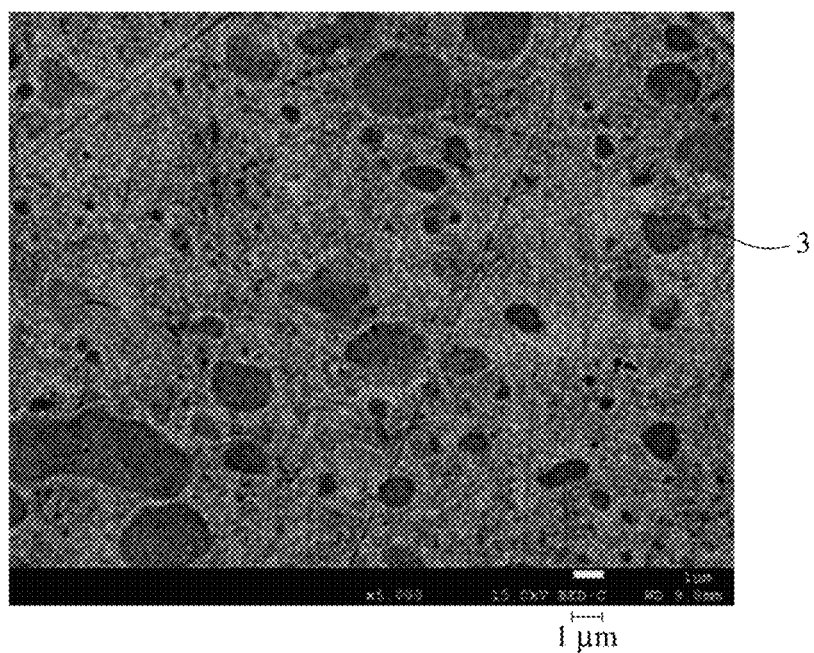
FIG. 2 is a view showing a backscattered electron image by FE-SEM of a base metal (steel material) of a piston ring of Comparative Example 1.
Figure 3:
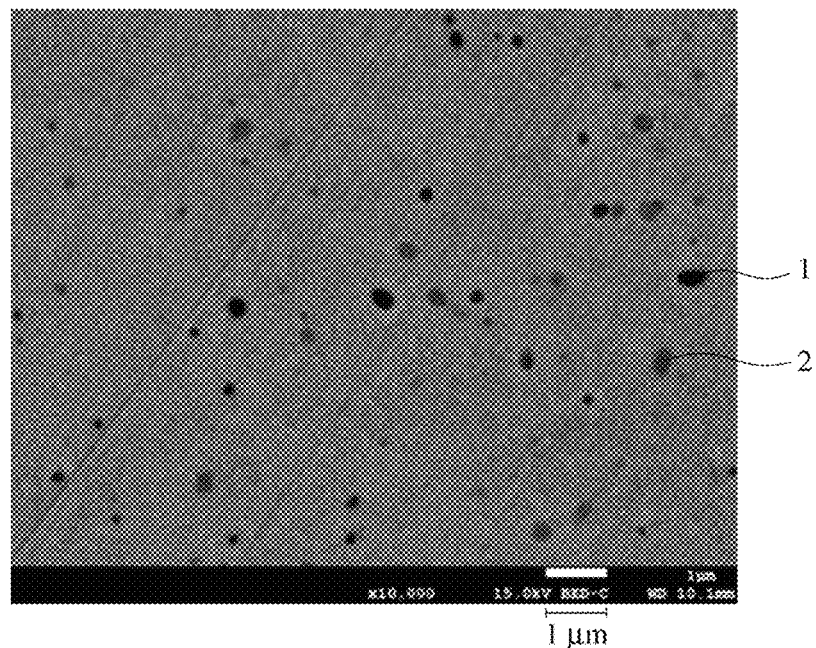
FIG. 3 is an enlarged view of FIG. 1.

On the other hand, in the base metal of a conventional 17Cr type martensite stainless steel piston ring, as shown in the backscattered electron image of Comparative Example 1 of FIG. 2, a coarser carbide 3 (with an average particle size of several micrometers) than in the present invention has been observed. Namely, it is indicated that in the base metal of the piston ring of the present invention, much finer carbides than ever are dispersed in the matrix.

The piston ring of the present invention can be imparted with a surface hardness of 700 to 1100 HV0.05 in terms of Vickers hardness by nitriding. However, the surface hardness is the hardness of the diffusion layer obtained by removing a compound layer formed on the outermost surface. The outermost surface of the nitride layer in the present invention preferably includes a diffusion layer. The Vickers hardness of the surface is more preferably 800 to 1050 HV0.05, and further preferably 900 to 1050 HV0.05. The nitride layer has a diffusion layer, whose Vickers hardness is 700 HV0.05 or more, preferably with a thickness of 30 μm or more, more preferably with a thickness of 40 μm or more, and further preferably with a thickness of 50 μm or more.

With a conventional 17Cr type martensite stainless steel piston ring, the following has been observed: repeated collision with the ring groove side surface of the piston causes the nitride and/or carbonitride at the nitride layer of the piston ring side surface to fall off, so that wear proceeds. However, with the piston ring of the present invention, nitride and carbonitride are far finer than with the aforementioned conventional piston ring. For this reason, proceeding of wear due to the wear mechanism described above is expected to be dramatically suppressed. The fine carbides dispersed in the piston ring base metal of the present invention are changed into carbonitrides or nitrides by nitriding, and are nitrided within the range in which the particle size does not largely change. Namely, the particle size of nitride and/or carbonitride to be dispersed in the diffusion layer after nitriding is preferably 0.05 to 0.30 μm in terms of an average particle size. The particle size of nitride and/or carbonitride is more preferably 0.05 to 0.25 μM, and further preferably 0.05 to 0.20 μm.

Further, the piston ring of the present invention has excellent thermal setting resistance. The thermal setting ratio is expressed as "Loss of Tangential Force under Temperature Effects" specified in ISO 6621-5: 2005 (E) (which is also referred to as "loss of tangential force" of the loss of tangential loss under temperature effects). In the case of the steel ring as in the present invention, the thermal setting ratio is specified at "8% or less" under the test conditions of 300° C. and 3 hours. However, a smaller thermal setting ratio, namely, a smaller loss of tangential force is more preferable. In the present invention, the thermal setting ratio is preferably 4% or less, more preferably 3.5% or less, and further preferably 3% or less under the test condition of 3 hours in 300° C. air. Also under the test condition of 3 hours in 400° C. air, the thermal setting ratio is preferably 10% or less, more preferably 9% or less, and further preferably 8% or less.

The piston ring of the present invention has excellent thermal setting resistance, and can also be subjected to a nitriding treatment. On the outer peripheral sliding face to come in sliding contact with the cylinder liner inner peripheral face, further, a hard film such as a Cr-plated film, a multilayer composite Cr-plated film, a ceramic sprayed film, a hard carbon film, or an ion plating film of CrN, TiN, or the like can be formed according to a usage environment.

The steel wire for use in the piston ring of the present invention is manufactured in the following manner: a steel including, by mass %, C: 0.30 to 0.65%, Si: 0.80 to 1.20%, Mn: 0.20 to 0.60%, Cr: 4.50 to 5.70%, and Cu: 0.01 to 0.5%, and at least one of Mo, V, W, and Co: 0.2 to 5.4% is molten, and then, formed into a steel wire by hot rolling; and the resulting steel wire is subjected to a series of wire drawing and heat treatments, resulting in a steel wire in a prescribed cross sectional shape. In the steps, an oil tempering treatment is performed under the conditions of a quenching temperature of 1000 to 1050° C., and a tempering temperature of 550 to 650° C.

Further, for a nitriding treatment, gas nitriding is preferably performed at a temperature of 550 to 600° C.

EXAMPLES

Example 1

A steel wire in rectangular cross section of 2.5 mm×3.8 mm was prepared which included, by mass %, C: 0.37%, Si: 1.00%, Mn: 0.50%, Cr: 5.00%, Cu: 0.032%, Mo: 1.30%, V: 0.85%, and the balance including Fe, and inevitable impurities (P: 0.007%, S: 0.001%), and was subjected to an oil tempering treatment at a quenching temperature of 1030° C. and a tempering temperature of 630° C. The steel wire was subjected to a curling processing, to produce a piston ring with a nominal diameter (d1) of 96 mm, an axial width (h1) of 2.5 mm, and a radial thickness (a1) of 3.8 mm. Further, the entire surface of the outer peripheral face, the inner peripheral face, and the upper, lower, and side surfaces of the piston ring was subjected to a nitriding treatment at 570° C. for 180 minutes.

[1] Thermal Setting Test

A thermal setting test is basically based on ISO 6621-5: 2005 (E). Specifically, the test is performed in the following manner: the tension is first identified, the ring is closed with a nominal diameter (e.g., set to a nominal-diameter cylinder), and is heated at 300° C. for 3 hours, then, the tension is measured again, so that the loss of tangential force thereof is evaluated. Incidentally, in the present invention, assuming the use under a higher-temperature higher-pressure environment than ever, the test was also performed under the conditions in which the temperature was set at 400° C. or 500° C., and the time was set at 10 hours in addition to the test conditions of 300° C. and 3 hours.

Comparative Example 1

A piston ring was produced, and a nitriding treatment was performed thereon in the same manner as that in Example 1, except for using a steel wire including, by mass %, C: 0.82%, Si: 0.38%, Mn: 0.35%, Cr: 17.40%, Mo: 1.10%, V: 0.08%, and the balance including Fe. The thermal setting test was performed under the conditions in which the temperature was set at three levels of 300° C., 400° C., and 500° C., and the time was set at 10 hours so as to make the difference from Example 1 clear. The results of the loss of tangential force are shown in Table 1 together with the results of Example 1.

TABLE 1

| Temperature ° C. | Example 1 | | Comparative Example 1 |
| --- | --- | --- | --- |
|  | 3 hours | 10 hours | 10 hours |
| 300 | 2 | 2.3 | 4.8 |
| 400 | 6.2 | 7.6 | 14 |
| 500 | 16.6 | 20.2 | 32 |

Figure 4:
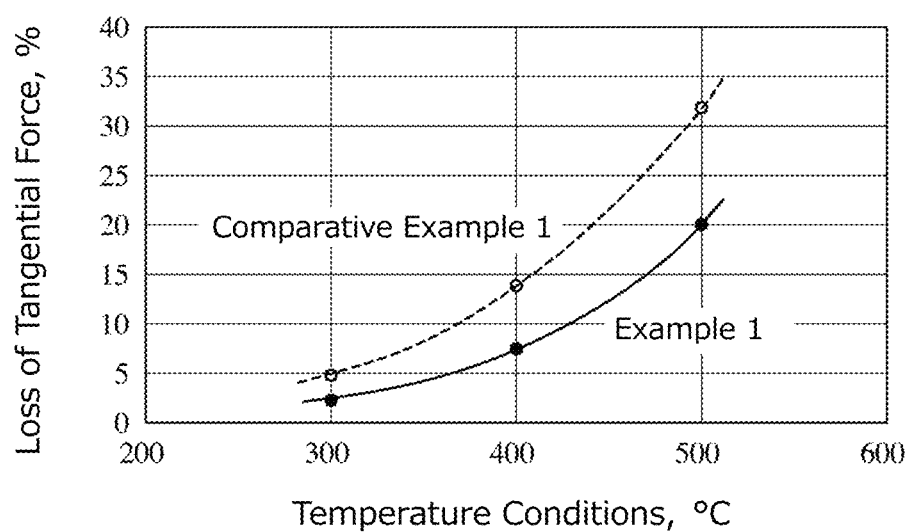
FIG. 4 is a view showing the loss of tangential forces of Example 1 and Comparative Example 1.

A 17Cr type martensite stainless steel piston ring of Comparative Example 1 exhibited excellent loss of tangential force of 4.8% (largely less than 8%) even under the conditions of 300° C. and 10 hours. However, at 400° C., the piston ring showed a loss of tangential force of 14% (the loss of tangential force is presumed to be about 11% even under the conditions of 400° C. and 3 hours). On the other hand, it has been confirmed that the piston ring of the present invention of Example 1 exhibits a loss of tangential force of 6.2% (7.6% even for 10 hours) at 400° C., indicating that the piston ring can be used under the current high-temperature high-pressure environment. FIG. 4 shows the relationship between the temperature conditions and the loss of tangential force.

[2] Hardness Test

As for each of Example 1 and Comparative Example 1, a hardness test was conducted for the mirror-polished surface of the nitride layer at a testing force of 0.9807 N using a micro-Vickers hardness tester. The results were 1010 HV0.1 for Example 1, and 1085 HV0.1 for Comparative Example 1.

[3] High-Temperature Wet-Wear Test

Figure 5:
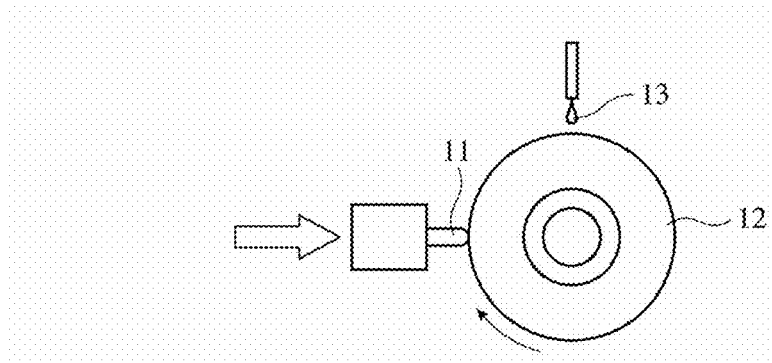
FIG. 5 is a schematic view of a wear tester.

As the evaluation of the wear resistance of the piston ring, a high-temperature wet-wear test was conducted. FIG. 5 shows the outline of a wear tester. A rotating drum 12 and a sliding specimen 11 are applied with a given load, and while adding a lubricating oil 13 dropwise thereon, the load application state was maintained for a given time. The wear (autogenous wear) of the specimen and the wear (mating material attackability) of the drum after an elapse of the given time are evaluated. The test conditions are as follows.

Specimen: nitrided piston ring (sliding in the ring axial direction)

Load: 490 N

Mating material (drum): FC250 material with a diameter of 80 mm

Sliding speed: 0.5 m/sec

Lubricant: SAE #30, 2 mL/min

Temperature: Drum surface temperature 180° C.

Time: 4 hours

The test results were evaluated by the wear depth for the wear of the film, and by the wear area of the cross section by observation of the cross section profile for the wear of the mating material. The results are shown in Table 2 together with the hardness of the nitride layer.

TABLE 2

|  | | Wear Test | |
| --- | --- | --- | --- |
|  | Hardness of Nitride Layer HV0.1 | Autogenous Wear μm | Mating Material Wear $10^{-4}$ cm$^2$ |
| Example 1 | 1010 | 2.4 | 0.20 |
| Comparative Example 1 | 1085 | 2.8 | 0.16 |

As apparent from Table 2, it has been confirmed that the piston ring of the present invention exhibits the wear resistance equivalent to that of a piston ring of a conventional 17Cr type martensite stainless steel.

REFERENCE SIGNS LIST

1 vanadium carbide
2 chromium carbide
3 chromium carbide
11 specimen for wear test
12 mating material (drum) for wear test
13 lubricating oil

The invention claimed is:

1. A piston ring excellent in thermal setting resistance and wear resistance, comprising a steel containing, by mass %, C: 0.30 to 0.65%, Si: 0.80 to 1.20%, Mn: 0.20 to 0.60%, Cr: 4.50 to 5.70%, Cu: 0.01 to 0.5%, and at least one of Mo, V, W, and Co: 0.2 to 5.4%.

2. The piston ring according to claim 1, wherein the steel includes, by mass %, C: 0.30 to 0.65%, Si: 0.80 to 1.20%, Mn: 0.20 to 0.60%, Cr: 4.50 to 5.70%, Cu: 0.01 to 0.5%, Mo: 1.0 to 1.6%, V: 0.5 to 1.2%, the balance: Fe, and inevitable impurities.

3. The piston ring according to claim 2, wherein the steel further includes Co: 2 mass % or less.

4. The piston ring according to claim 2, wherein the steel includes P in an amount of 0.002 to 0.02 mass % as the inevitable impurities.

5. The piston ring according to claim 2, wherein the steel includes vanadium carbide particles with an average particle size of 0.05 to 0.30 μm dispersed therein.

6. The piston ring according to claim 1, wherein the steel includes, by mass %, C: 0.30 to 0.65%, Si: 0.80 to 1.20%, Mn: 0.20 to 0.60%, Cr: 4.50 to 5.70%, Cu: 0.01 to 0.5%, V: 0.5 to 1.2%, and wherein the total amount of (W+2·x Mo) is 2.0 to 3.2 mass %, the balance: Fe, and inevitable impurities.

7. The piston ring according to claim 1, comprising a nitride layer formed at least one of upper and lower side surfaces thereof perpendicular to an axial direction of the piston ring.

8. The piston ring according to claim 7, wherein in the nitride layer, at least one of nitride particles and carbonitride particles with an average particle size of 0.05 to 0.30 μm are dispersed.

9. The piston ring according to claim 1, wherein a loss of tangential force of the piston ring is 4% or less under test conditions of 3 hours in 300° C. air.

10. The piston ring according to claim 1, wherein a loss of tangential force of the piston ring is 10% or less under test conditions of 3 hours in 400° C. air.

11. The piston ring according to claim 1, wherein at least an outer peripheral face of the piston ring includes at least one hard film layer selected from a nitride layer, hard chromium plating, hard ceramic, and hard carbon.

* * * * *